United States Patent
Lugo

[15] 3,672,417
[45] June 27, 1972

[54] COMBINATION SHAPER BLADE AND SUPPORT THEREFOR

[72] Inventor: Roberto Lugo, Av. Nacional, 45, Panama City, Panama

[22] Filed: May 12, 1970

[21] Appl. No.: 36,529

[52] U.S. Cl. .............................144/218, 144/241, 144/90 A
[51] Int. Cl. .......................................................B27g 13/12
[58] Field of Search..............144/218, 230, 231, 236, 134 A, 144/241, 90 A, 218, 134.8; 29/105

[56] References Cited

UNITED STATES PATENTS

| | | | |
|---|---|---|---|
| 1,162,255 | 11/1915 | Ross.................................144/218 UX |
| 768,625 | 8/1904 | Quinn................................144/231 X |
| 2,192,522 | 3/1940 | Misuraca...........................144/218 X |
| 1,298,723 | 10/1942 | Rice....................................144/231 |

Primary Examiner—Donald R. Schran
Attorney—Berman, Davidson and Berman

[57] ABSTRACT

A combination blade and support therefor in which the blade is eccentrically positioned with respect to the spindle and plane of the shaper blade extends at an oblique angle to the axis of rotation. The shaper blade is adjustable endwise with respect to its support to selectively present the cutting edges at each end to the work. The shaper blade cutting edges at each end of the blade may carry the same pattern or different patterns corresponding to the direction of rotation. The angular relationship of the plane of the blade to the axis of rotation reduces the shock load of the cut by having the blade enter the work gradually in a slice rather than abruptly as a chop. The support applies a firm, secure wedge-grip to the blade.

4 Claims, 6 Drawing Figures

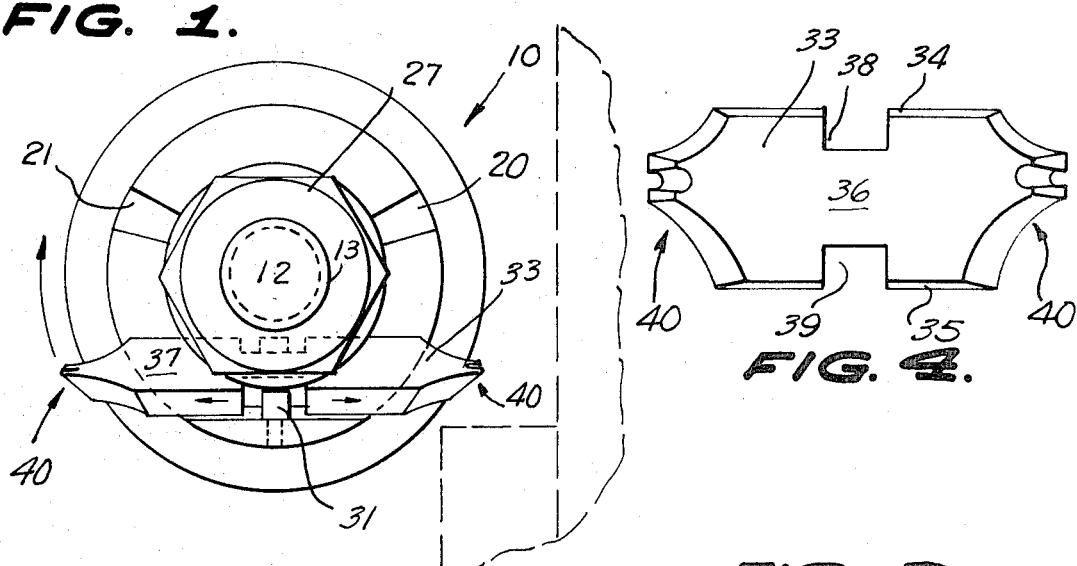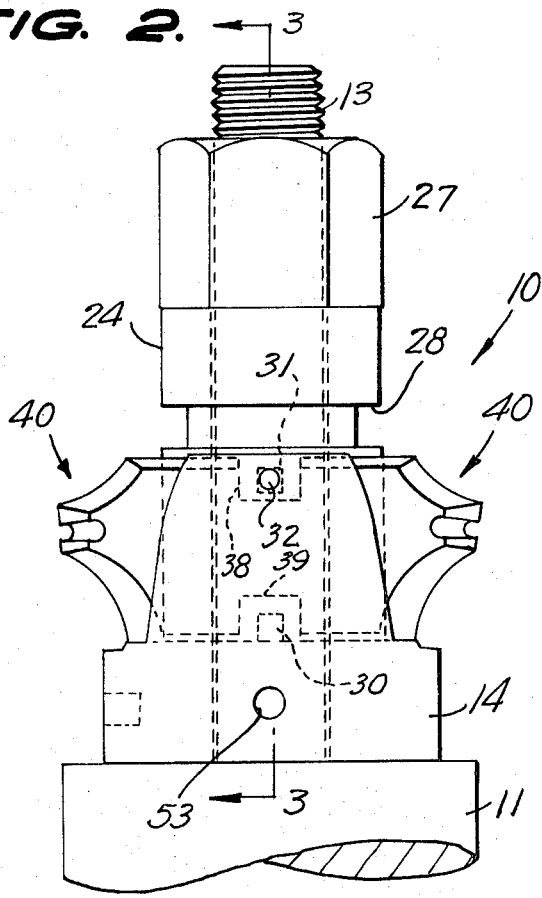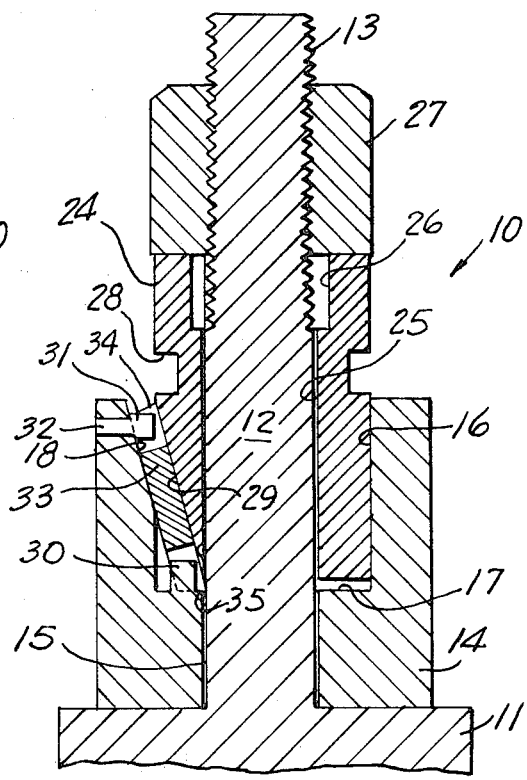

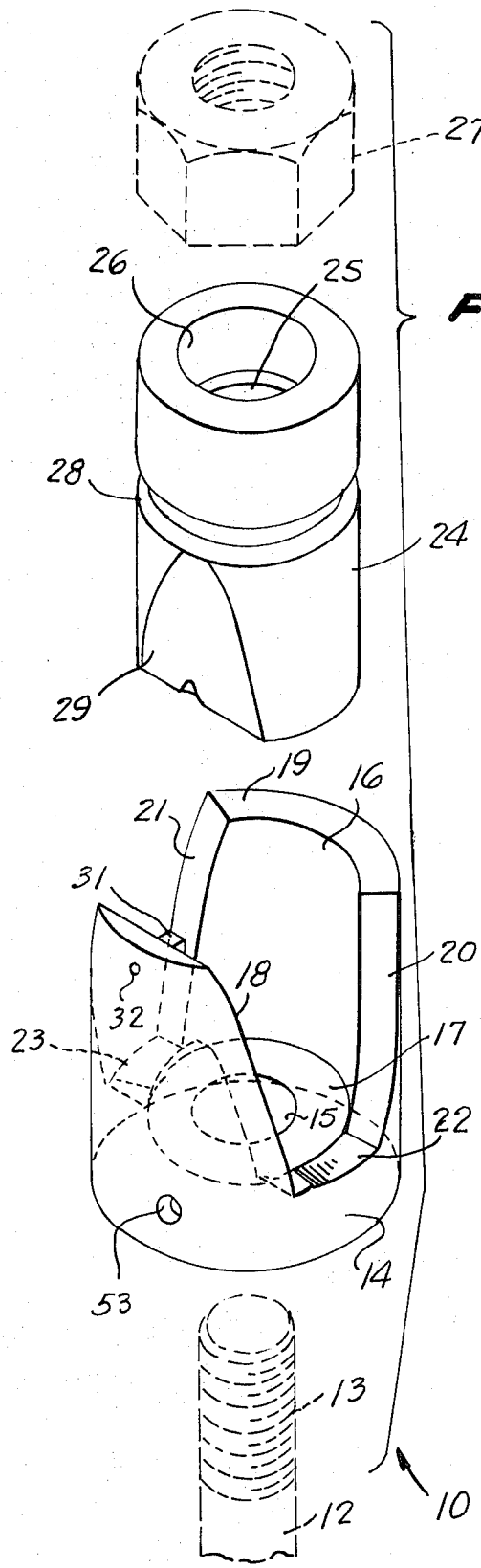
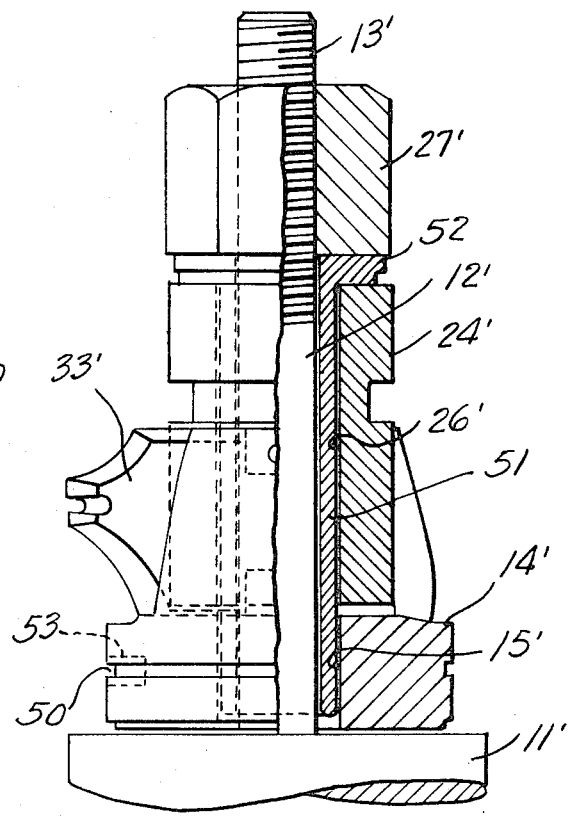
FIG. 5.
FIG. 6.
INVENTOR.
ROBERTO LUGO,
BY
Berman, Davidson & Berman,
ATTORNEYS.

COMBINATION SHAPER BLADE AND SUPPORT THEREFOR

BACKGROUND OF THE INVENTION

FIELD OF THE INVENTION

The present invention relates to shapers and more particularly to combinations of shaper blades with the structure for supporting the shaper blade and rotating same against the work. Shapers of this type are useful for producing trim and moulding used in the construction of homes and cabinetry.

This invention relates to a shaper blade support for clamping a shaper blade on a spindle to be rotated thereby. The shaper blade is positioned with its plane at an oblique angle to the axis of the spindle and the blade is endwise adjustable to selectively present either cutting edge to the work. Bosses on the support engage in openings in both the bottom and top edges of the blade and prevents the blade from sliding from the support even if the clamping should loosen.

The primary object of the invention is to provide a combination shaper cutter blade and support therefor in which the generally flat blade is supported at an angle to the axis of rotation so that the cutting edge enters the work gradually rather than abruptly producing a smoother slicing cut.

Other objects and advantages will become apparent in the following specification when considered in light of the attached drawings.

BRIEF DESCRIPTION OF THE DRAWINGS

FIG. 1 is a top plan view of the invention;

FIG. 2 is a front elevation of the invention;

FIG. 3 is a vertical sectional view taken along the line 3—3 of FIG. 2 looking in the direction of the arrows;

FIG. 4 is a front elevation of the shaper blade removed from the support.

FIG. 5 is an exploded perspective view of the blade clamp; and

FIG. 6 is a rear elevational view of a slightly modified form of the invention used on smaller spindles, partially broken away and in section for convenience of illustration.

DESCRIPTION OF THE PREFERRED EMBODIMENT

Referring now to the drawings in detail wherein like reference characters indicate like parts throughout the several figures, the reference numeral 10 indicates generally a shaper blade support constructed in accordance with the invention.

The shaper blade support 10 is adapted for use on a spindle 11 having a reduced diameter extension 12 axially formed on one end thereof with the reduced diameter extension 12 threaded at 13 to its outer end.

A generally cylindrical base member 14 engages over the reduced diameter extension 12 and is supported on the spindle 11 as can be seen in FIG. 3. The base member 14 has an axial bore 15 opening through the bottom thereof communicating with a substantially larger axial bore 16 which opens through the top of the base member 14. The bores 15 and 16 are axially aligned and at their juncture form a horizontal shoulder 17 at the inner end of the bore 16.

A downwardly and inwardly sloping cut 18 extends from the top 19 of the base member 14 terminating at the shoulder 17. The cut 18 intersects the bore 16 at a point spaced well above the shoulder 17. A sloping cut 20 extends from the outside into the bore 16 from the top 19 to the shoulder 17, a second sloping radial cut 21 also extends from the top 19 to the shoulder 17 with the sloping 20, 21 being oppositely disposed and spaced apart equally from the cut 18 as can be seen in FIG. 5. The material between the cuts 18, 20 is removed leaving an outwardly and downwardly sloping base 22. The material between the sloping cut 21 and the cut 18 is also removed leaving an outwardly and downwardly slope base 23.

A generally cylindrical plug 24 has a diameter slightly smaller than the bore 16 and is provided with an internal bore 25 of the same size as the bore 15. The axial bore 25 is adapted to engage over the reduced diameter extension 12 of the spindle 11 with the plug 24 extending downwardly into the bore 16 to a point spaced above the shoulder 17. The plug 24 has a counter bore 26 opening axially inwardly from the end thereof as can be seen in FIGS. 3 and 5. The counter bore 26 provides clearance about the threads 13 so that as the nut 27 moves the plug downwardly into the base member 14 the threads 13 are not damaged.

An annular groove 28 is formed in the outer surface of the plug 24 intermediate the upper and lower ends thereof. The groove 28 provides means for connecting a puller to the plug 24 to pull it from the spindle 11 should it become jammed thereon. A wedge surface 29 is cut into the lower portion of the plug 24 at an angle to the axis thereof sloping inwardly and downwardly toward the axis. The wedge surface 29 and the cut 18 have the same slope and serve as opposite faces of a wedge clamp as can be clearly seen in FIG. 3. A generally rectangular boss 30 projects upwardly from the shoulder 17 in the center of the cut 18 for reasons to be assigned. A second generally rectangular boss 31 includes a tenon 32 which extends through the wall of the base member 14 centrally thereof. The boss 31 is positioned centrally of the top of the cut 18 for reasons to be assigned.

A shaper cutter blade 33 formed of generally flat stock has beveled upper and lower edges 34, 35 respectively so as to engage the shoulder 17 as shown in FIG. 3 when the cutter blade 33 has its flat side 36 in engagement with the wedge jaw face 18. The shaper blade 33 has a second generally flat side 37 parallel to the generally flat side 36 and arranged to engage the clamp face 29 with the shaper blade 33 in a position as illustrated in FIG. 3.

The bevel of the edges 34 and 35 correspond to the angle between the shoulder 17 and the wedge surface 29 to encourage correct seating of the blade 33 in its support.

A generally rectangular opening 38 is formed centrally of the upper edge 34 of the shaper blade 33 and a second generally rectangular opening 39 is formed in the lower edge 35 of the cutter blade 33 with the openings 38, 39 being positioned centrally of the shaper blade 33. The generally rectangular opening 39 is adapted to engage over the boss 30 as can be seen in FIG. 3 and the generally rectangular opening 38 engages over the boss 31 as can also be seen in FIG. 3. The function of the rectangular openings 38, 39 and the bosses 30, 31 is to provide means to lock the shaper blade 33 in the support 10 while permitting endwise adjustment of the shaper blade 33 as required. The blade 33 may be rotated 180° in its own plane with the openings 38, 39 engaging the bosses 31, 30 respectively.

The shaper blade 33 has formed cutting edges 40 on each end thereof for cutting trim moulding on a conventional shaper as the spindle 11 is revolved about its axis. The mounting of the shaper blade 33 so that its generally flat surfaces extend at an oblique angle to the axis of the spindle 11 permits the cutting edges 40 to enter the work with a smooth slicing motion rather than with the chopping cut of conventional upright shapers. The cutting edges 40 as seen in FIG. 4 are reversed so that reverse cutting can occur upon reverse rotation of the spindle 11 to permit the cut to be matched to the grain of the wood being shaped. In mounting the shaper blade 33 the cutting edges 40 on the end to be used in making the cut will be moved so as to project slightly further from the spindle 11 than the cutting edges on the opposite end thereof. The cutting edges 40 on the shaper blade 33 may also be made entirely differently for a different style cut and in this case the shaper blade 33 is removed and inverted in its own plane to present the cutting edges 40 at its opposite end to the desired work. It should be noted that the shaper blade 33 is formed entirely of generally flat material and can be cut out in a machine shop without special casting and forming.

A bore 53 extends radially into the base member 14 to provide a socket for a tool used for tightening etc.

In FIG. 6 a modified form of the invention is illustrated wherein a spindle 11' has a reduced diameter extension 12' somewhat smaller than the extensions 12 and the extension 12' is threaded at 13'. A base member 14' is provided identical to the base member 14 except that it has a pulling groove 50 formed annularly in the lower outer face thereof. A plug 24' identical to the plug 24 is provided with bore 26' extending axially therethrough. A tubular sleeve 51 surrounds the extension 12' and engages in the bores 15', 26' to compensate for the smaller diameter of the extension 12'. The sleeve 51 has an annular flange 52 on its upper end and the clamp nut 27' clamps thereagainst.

The plug 24' and base member 14' clamp the shaper blade 33' in cutting position in exactly the same manner as the preferred form of the invention. It should be understood that the bores may be beveled at each end to facilitate inserting and removal from the shafts.

Having thus described the preferred embodiments of the invention it should be understood that numerous structural modifications and adaptations may be resorted to without departing from the spirit of the invention.

I claim:

1. A combination shaper blade support and shaper blade for mounting on a threaded rotatable spindle including a spindle nut comprising a generally cylindrical base member having an axial bore extending therethrough for engaging about said spindle, said base member having an axial counterbore extending from one end of said member and communicating with said axial bore, said counter bore having a diameter substantially greater than said axial bore to form a shoulder at a juncture of said counterbore with said axial bore, a wedge jaw face on said base member extending from said one end of said member to said shoulder, said jaw face sloping outwardly from the axis of said member in the direction away from said shoulder, a generally cylindrical plug having an axial bore for engagement over said spindle, the outer diameter of said plug being slightly less than the inner diameter of said counterbore with said plug being axially movable in said counterbore on said spindle, a wedge jaw face formed in the outer cylindrical surface of said plug sloping outwardly from the axis of said plug from the end of said plug engaged in said counterbore, said second wedge jaw arranged in spaced parallel relation to said first wedge jaw, a generally flat shaper blade mounted between said jaw faces, said shaper blade having a generally rectangular notch formed in its upper and lower edges, a boss integrally formed on said shoulder centrally with respect to said first wedge jaw face to engage in the notch in the lower edge of said blade, a boss rigidly secured to said member centrally with respect to said first wedge jaw face to engage in the notch in the upper edge of said blade, said bosses being substantially shorter than the length of said notches to permit said blade to be adjusted with respect to said support, said shaper blade being clamped in said support by axial movement of said plug under pressure from said spindle nut.

2. A combination as claimed in claim 1 wherein said shaper blade is provided with cutting edges at its opposite ends and said shaper blade is invertible in said support to selectively present the cutter edges at each end to the work.

3. A combination as claimed in claim 2 wherein said blade has beveled upper and lower edges for cooperation with said support.

4. A combination as claimed in claim 2 wherein the cutting edge on said cutter is presented to the work angularly to produce a slice cut.

* * * * *